United States Patent
Weiss et al.

(10) Patent No.: US 12,341,833 B2
(45) Date of Patent: Jun. 24, 2025

(54) PRODUCTION TOOLS FOR COLLABORATIVE VIDEOS

(71) Applicant: Salesforce, Inc., San Francisco, CA (US)

(72) Inventors: Noah Weiss, Austin, TX (US); Julie Haynes, Oakland, CA (US); Anna Niess, New York, NY (US); Dolapo Falola, New York, NY (US); Olivia Grace, San Francisco, CA (US)

(73) Assignee: Salesforce, Inc., San Francisco, CA (US)

(*) Notice: Subject to any disclaimer, the term of this patent is extended or adjusted under 35 U.S.C. 154(b) by 178 days.

(21) Appl. No.: 17/589,836

(22) Filed: Jan. 31, 2022

(65) Prior Publication Data

US 2023/0247068 A1    Aug. 3, 2023

(51) Int. Cl.
*H04L 65/402* (2022.01)
*H04L 65/403* (2022.01)

(52) U.S. Cl.
CPC ........ *H04L 65/4025* (2022.05); *H04L 65/403* (2013.01)

(58) Field of Classification Search
CPC ............... H04L 65/4025; H04L 65/403; H04L 65/1069; H04L 65/4015
See application file for complete search history.

(56) References Cited

U.S. PATENT DOCUMENTS

| | | |
|---|---|---|
| 6,008,804 A | 12/1999 | Pommier et al. |
| 7,913,178 B2 | 3/2011 | Gould et al. |
| 8,924,844 B2 | 12/2014 | Lynch |
| 9,418,388 B1 | 8/2016 | Young |
| 10,049,472 B1 | 8/2018 | Croom et al. |
| 10,229,204 B1 | 3/2019 | Grant et al. |
| 10,692,138 B1 | 6/2020 | Nguyen et al. |
| 10,721,278 B2 | 7/2020 | Coppinger et al. |
| 10,819,532 B1 * | 10/2020 | van Rensburg ......... H04L 51/52 |
| 10,848,445 B1 | 11/2020 | Willmann |

(Continued)

OTHER PUBLICATIONS

Bertino et al. Specifying and enforcing access control policies for XML document sources. World Wide Web 3 (2000), pp. 139-151, 2000.

(Continued)

*Primary Examiner* — William G Trost, IV
*Assistant Examiner* — Adam A Cooney
(74) *Attorney, Agent, or Firm* — Lee & Hayes, P.C.

(57) ABSTRACT

A system, method, and computer-readable media for creating a collaboration container in a group-based communication system are provided. A request to create the collaboration container may be received. The collaboration container may comprise a collection of multimedia files. Multiple users may add multimedia files to the collaboration containers. The multimedia files may be stored in a storage order. The multimedia files in the collaboration container may be sorted based on a sort label, such as by multimedia file topic. Upon playback, the multimedia files may be played back in a sort order distinct from the storage order. During playback, a user may comment on a multimedia file of the collaboration container. When subsequent users playback the collaboration container, the comment may be displayed with the associated multimedia file.

20 Claims, 7 Drawing Sheets

(56) References Cited

U.S. PATENT DOCUMENTS

| | | | |
|---|---|---|---|
| 11,042,575 | B2 | 6/2021 | Fox et al. |
| 11,128,483 | B1* | 9/2021 | Surazski ............... G06V 20/30 |
| 11,256,387 | B1 | 2/2022 | Huff et al. |
| 11,301,200 | B2 | 4/2022 | Zhang et al. |
| 11,374,990 | B2 | 6/2022 | Lansing et al. |
| 2004/0267871 | A1 | 12/2004 | Pratley et al. |
| 2005/0132281 | A1 | 6/2005 | Pan et al. |
| 2005/0193325 | A1 | 9/2005 | Epstein |
| 2007/0016613 | A1 | 1/2007 | Foresti et al. |
| 2007/0283278 | A1 | 12/2007 | Hupfer et al. |
| 2008/0183819 | A1 | 7/2008 | Gould et al. |
| 2008/0229185 | A1 | 9/2008 | Lynch |
| 2009/0157811 | A1 | 6/2009 | Bailor et al. |
| 2009/0271696 | A1 | 10/2009 | Bailor et al. |
| 2012/0096002 | A1 | 4/2012 | Sheehan et al. |
| 2012/0310956 | A1 | 12/2012 | Huhn |
| 2013/0080919 | A1 | 3/2013 | Kiang et al. |
| 2013/0091298 | A1* | 4/2013 | Ozzie ............... H04L 65/612 709/231 |
| 2013/0174032 | A1 | 7/2013 | Tse et al. |
| 2013/0297680 | A1 | 11/2013 | Smith et al. |
| 2013/0318125 | A1 | 11/2013 | Smith et al. |
| 2013/0347070 | A1 | 12/2013 | Cairns et al. |
| 2014/0169767 | A1* | 6/2014 | Goldberg ............ G06Q 10/10 386/282 |
| 2014/0258972 | A1 | 9/2014 | Savage et al. |
| 2015/0358326 | A1 | 12/2015 | Varshney et al. |
| 2016/0226935 | A1 | 8/2016 | Coppinger et al. |
| 2016/0315995 | A1 | 10/2016 | Hausler et al. |
| 2017/0063749 | A1 | 3/2017 | Gupta et al. |
| 2017/0132200 | A1 | 5/2017 | Noland et al. |
| 2017/0310771 | A1 | 10/2017 | Lewis et al. |
| 2018/0157390 | A1 | 6/2018 | Vas et al. |
| 2018/0276053 | A1 | 9/2018 | Kesavan et al. |
| 2018/0287982 | A1 | 10/2018 | Draeger et al. |
| 2018/0321889 | A1 | 11/2018 | Harris et al. |
| 2019/0058680 | A1 | 2/2019 | Rosania et al. |
| 2019/0098087 | A1 | 3/2019 | Johnston et al. |
| 2019/0102472 | A1 | 4/2019 | Rensburg et al. |
| 2019/0108241 | A1 | 4/2019 | Emerick et al. |
| 2019/0166330 | A1 | 5/2019 | Ma et al. |
| 2019/0179876 | A1 | 6/2019 | Zhang et al. |
| 2019/0190863 | A1 | 6/2019 | Baker et al. |
| 2019/0253430 | A1 | 8/2019 | Gamache et al. |
| 2019/0297304 | A1* | 9/2019 | Li ............... H04N 7/15 |
| 2019/0303493 | A1 | 10/2019 | Ekambaram et al. |
| 2019/0325213 | A1 | 10/2019 | Numata |
| 2020/0090135 | A1 | 3/2020 | Malcangio et al. |
| 2020/0106630 | A1 | 4/2020 | Bourassa et al. |
| 2020/0279070 | A1 | 9/2020 | Rose et al. |
| 2020/0293185 | A1 | 9/2020 | Shedigumme et al. |
| 2020/0348802 | A1 | 11/2020 | Brito et al. |
| 2020/0387567 | A1 | 12/2020 | Loforte et al. |
| 2021/0056184 | A1 | 2/2021 | Modani et al. |
| 2021/0075782 | A1 | 3/2021 | Dunjic et al. |
| 2021/0105332 | A1* | 4/2021 | Bellet ............... H04L 67/54 |
| 2021/0150480 | A1 | 5/2021 | Haramati et al. |
| 2021/0248556 | A1 | 8/2021 | Venkatraman et al. |
| 2021/0397402 | A1 | 12/2021 | Ashkenazi et al. |
| 2022/0078143 | A1 | 3/2022 | Eirinberg et al. |
| 2022/0086200 | A1 | 3/2022 | Lansing et al. |
| 2022/0114142 | A1* | 4/2022 | Madisetti ............... G06F 16/48 |
| 2022/0139383 | A1* | 5/2022 | Rose ............... H04L 12/1827 704/232 |
| 2022/0222625 | A1 | 7/2022 | Haramati et al. |
| 2022/0263877 | A1* | 8/2022 | Conlin ............... H04N 7/152 |
| 2022/0350896 | A1 | 11/2022 | Whitcomb et al. |
| 2022/0365740 | A1 | 11/2022 | Chang et al. |
| 2023/0096672 | A1 | 3/2023 | Bhat et al. |
| 2023/0156063 | A1* | 5/2023 | Tiwari ............... G06V 20/46 348/14.08 |
| 2023/0206179 | A1 | 6/2023 | Fong et al. |
| 2023/0216816 | A1 | 7/2023 | Fong et al. |
| 2023/0244434 | A1 | 8/2023 | Weiss et al. |
| 2023/0244802 | A1 | 8/2023 | Paul et al. |
| 2023/0244848 | A1 | 8/2023 | Hahn |
| 2023/0260533 | A1* | 8/2023 | Farrell ............... G10L 25/27 704/231 |
| 2023/0353651 | A1 | 11/2023 | Maurer et al. |

OTHER PUBLICATIONS

Hu, Vincent, et al., NIST Special Publication 800-205, Attribute Considerations for Access Control Systems, https://nvlpubs.nist.gov/nistpubs/SpecialPublications/NIST.SP.800-205.pdf, Jun. 2019.

U.S. Appl. No. 17/564,506, Notice of Allowance dated Jun. 5, 2023.

U.S. Appl. No. 17/589,584, Notice of Allowance dated May 18, 2023.

U.S. Appl. No. 17/589,692, Final Office Action dated May 12, 2023.

U.S. Appl. No. 17/564,506, Final Office Action issued Feb. 3, 2023.

U.S. Appl. No. 17/589,584, Non-Final Office Action issued Jan. 20, 2023.

U.S. Appl. No. 17/589,692, Non-Final Office Action issued Jan. 18, 2023.

PCT Patent Application PCT/US2022/052680 International Search Report and Written Opinion of the International Search Report, issued Apr. 5, 2023.

U.S. Appl. No. 17/566,947, Non-final Office Action issued Apr. 24, 2023.

U.S. Appl. No. 17/589,822, Final Office Action issued Mar. 23, 2023.

U.S. Appl. No. 17/564,506, Non-Final Office Action dated Oct. 6, 2022.

Hu, Vincent C. et al.; Attribute Considerations for Access Control Systems; NIST Special Publication 800-205; U.S. Department of Commerce; pp. 1-42; https://doi.org/10.6028/NIST.SP.800-205; retrieved on Aug. 24, 2022.

U.S. Appl. No. 17/589,692, Non-Final Office Action dated Jan. 18, 2023.

Malik et al. A Comparison of Collaborative Access Control Models, IJACSA 8:3, 2017, pp. 209-206. (2017).

U.S. Appl. No. 17/589,822, Non-Final Office Action dated Nov. 30, 2022.

"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013) 2 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html> (dated May 28, 2014) 8 pages.

Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 13 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014) 4 pages.

Matsumoto, T. et al., "Chocoa Communicator—A New Communication System Based on Awareness and Text Communications-", Fujitsu Sci. Tech. J., 36, 2, (Dec. 2000) 154-161.

Matthew Ingram, "Flickr co-founder launches Slack, an all-in-one messaging tool designed to kill email forever", Gigaom, Lexisnexis,

(56) References Cited

OTHER PUBLICATIONS https://advance.lexis.com/api/permalink/0b676b7c-aec3-4560-861e-d030d1dd008c/?context=1000516, (dated Feb. 12, 2014), 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

Karjoth, Gunter, "The Authorization Service of Tivoli Policy Director," Seventeenth Annual Computer Security Applications Conference, 2001, ACSAC 2001, Dec. 2001, pp. 319-328.

Office Action for U.S. Appl. No. 17/564,506, mailed on Mar. 10, 2022, Andrew Fong, "Workflows for Documents," 14 pages.

Office Action for U.S. Appl. No. 17/589,692, mailed on Apr. 8, 2022, Sohom Paul, "Managing Permissions for Collaborative Shared Documents," 9 pages.

Office Action for U.S. Appl. No. 17/564,506, mailed on Jul. 18, 2022, Andrew Fong, "Workflows for Documents," 16 pages.

Office Action for U.S. Appl. No. 17/589,692, mailed on Jul. 28, 2022, Sohom Paul, "Managing Permissions for Collaborative Shared Documents," 12 pages.

Office Action for U.S. Appl. No. 17/566,947, mailed on Oct. 5, 2023, Andrew Fong, "Collaboration Software Development Kit," 19 pages.

Office Action for U.S. Appl. No. 17/589,692, mailed on Oct. 13, 2023, Sohom Paul, "Managing Permissions for Collaborative Shared Documents," 16 pages.

Office Action for U.S. Appl. No. 17/733,439, mailed on Dec. 15, 2023, Aaron Maurer, "Identifying Suggested Contacts for Connection," 20 pages.

Trevor, et al., "AnySpot: Pervasive Document Access and Sharing," Pervasive computing, IEEE Computer Society, 6(3), Aug. 2007, pp. 76-84.

Office Action for U.S. Appl. No. 17/733,439, mailed on Jun. 17, 2024, Maurer, "Identifying Suggested Contacts for Connection", 25 Pages.

Office Action for U.S. Appl. No. 17/733,439, mailed on Mar. 26, 2024, Maurer, "Identifying Suggested Contacts for Connection," 25 pages.

Office Action for U.S. Appl. No. 17/733,439, mailed on Dec. 3, 2024, Maurer, "Identifying Suggested Contacts for Connection", 29 pages.

\* cited by examiner

PRODUCTION TOOLS FOR COLLABORATIVE VIDEOS

TECHNICAL FIELD

Embodiments of the invention relate to video production tools for group-based communication systems. More specifically, embodiments of the invention relate to production tools for generating edited videos from virtual meetings for asynchronous consumption.

Traditional synchronous virtual meetings are often overlong and can waste valuable working hours. Meetings may cover multiple topics throughout the course of the meeting. A user who only cares about one particular topic in a meeting may nevertheless be required to attend the entire meeting to ensure the user does not miss any discussions relating to the topic the user cares about. What is needed are improved video production tools to condense a virtual meeting into an edited or excerpted video to increase efficiency and reduce the reliance on traditional meetings.

SUMMARY

Embodiments of the invention solve the above-mentioned problems by providing a system, method, and computer-readable media for generating edited videos for group-based communication systems. Users may participate in video collaboration sessions from which transcripts may be generated. A user may select sections of the transcripts corresponding to portions of the video collaboration sessions. An edited or excerpted video may be generated comprising the portions of the video collaboration session. Various video production tools may be provided to allow the user to modify the edited or excerpted video. The excerpted videos and other multimedia files may be added to a collaboration container. The multimedia files in the collaboration container may be sorted and played back according to a sort order.

A first embodiment of the invention is directed to one or more non-transitory computer-readable media storing computer-executable instructions that, when executed by a processor, perform a method of creating a collaboration container, comprising receiving a request to create the collaboration container, receiving a plurality of multimedia files, storing the plurality of multimedia files in the collaboration container, receiving, from a user, a sort command, the sort command indicating an updated sort order distinct from a storage order for the plurality of multimedia files in the collaboration container, receiving a request to playback the collaboration container, and responsive to receiving the request to playback the collaboration container, playing back a portion of the plurality of multimedia files in the updated sort order. The collaboration container may contain a collection of multimedia files. A first multimedia file may be received from a first user, and a second multimedia file may be received from a second user of a group-based communication system.

A second embodiment of the invention is directed to a method of creating a collaboration container, comprising receiving a request to create the collaboration container, receiving a plurality of multimedia files, storing the plurality of multimedia files in the collaboration container, receiving, from a user, a sort command, the sort command indicating an updated sort order distinct from a storage order for the plurality of multimedia files in the collaboration container, receiving a request to playback the collaboration container, and responsive to receiving the request to playback the collaboration container, playing back a portion of the plurality of multimedia files in the updated sort order. The collaboration container may contain a collection of multimedia files. A first multimedia file may be received from a first user, and a second multimedia file may be received from a second user of a group-based communication system.

A third embodiment of the invention is directed to a system for creating a collaboration container, the system comprising a data store, a processor, and one or more non-transitory computer-readable media storing computer-executable instructions that, when executed by a processor, perform a method of creating the collaboration container, comprising receiving a request to create the collaboration container, receiving a plurality of multimedia files, storing the plurality of multimedia files in the collaboration container, receiving, from a user, a sort command, the sort command indicating an updated sort order distinct from a storage order for the plurality of multimedia files in the collaboration container, receiving a request to playback the collaboration container, and responsive to receiving the request to playback the collaboration container, playing back a portion of the plurality of multimedia files in the updated sort order. The collaboration container may contain a collection of multimedia files. A first multimedia file may be received from a first user, and a second multimedia file may be received from a second user of a group-based communication system.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1A:
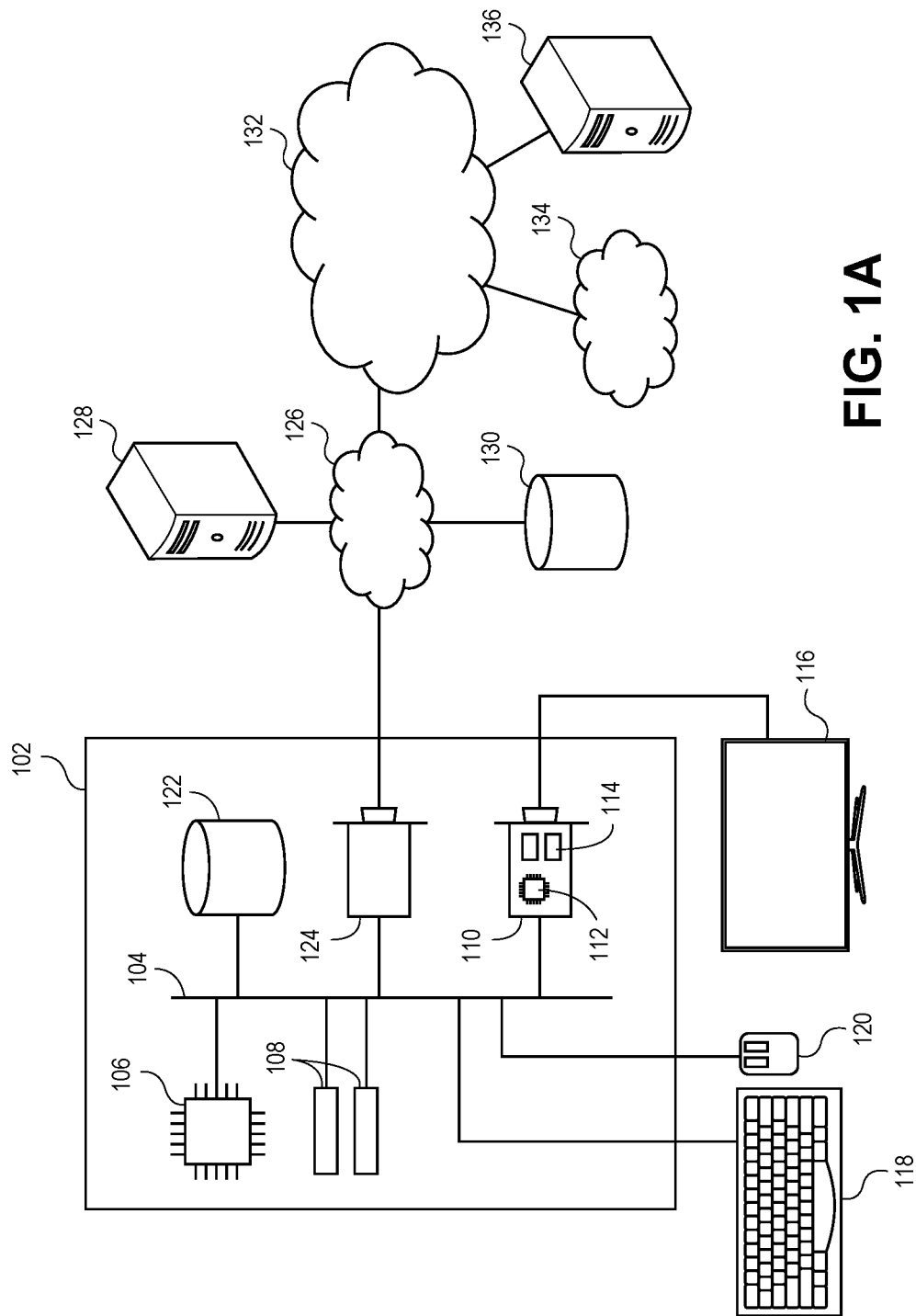
FIG. 1A depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

Context and Concepts of the Invention

Disclosed embodiments are generally directed to generating an edited or excerpted video from one or more videos. The videos may be videos from video collaboration sessions which may comprise synchronous video collaboration sessions, asynchronous collaboration sessions, or a combination thereof. A creating user may select portions of the videos to include in the excerpted video. In some embodiments, the videos are transcribed, and the creating user selects sections of the transcripts. These transcript sections may be used to determine which portions of the videos should be included in the excerpted video. In some embodiments, the excerpted video comprises chapters corresponding to the sections. Topics for the excerpted video may be determined based on the selected sections. The excerpted video may be provided to a viewing user for asynchronous consumption. In some embodiments, the excerpted video may be consumable in an audio-only format. The excerpted video and other multimedia files may be added to a collaboration container. The collaboration container may comprise a collection of multimedia files. A viewing user may select specific multimedia files (e.g., corresponding to a specific topic or author) of the collaboration container to view upon playback.

As used herein, the term "group-based communication system" refers to a collaborative communication system used within an organization and is distinct from a conventional email or SMS messaging system. In some embodiments, the group-based communication system is a channel-based messaging platform. Within the group-based communication system, communication may be organized into "channels," each dedicated to a particular topic or set of users. Channels are generally long-lasting, persistent discussions of a particular topic. Members of a particular channel can post messages within that channel that are visible to other members of that channel together with other messages in that channel. Users may select a channel for viewing in order to see only those messages relevant to the topic of that channel without seeing messages posted in other channels on different topics. For example, a software development company may have different channels for each software product being developed, where developers working on each particular project can converse without bothering (or being bothered by) developers working on other projects. Because the channels are generally persistent and directed to a particular topic or group, users can quickly and easily refer back to previous communications for reference.

In some embodiments, the group-based communication system may include synchronous multimedia collaboration sessions. Synchronous multimedia collaboration sessions may provide ambient, ad hoc multimedia collaboration in the group-based communication system. Users of the group-based communication system can quickly and easily join and leave these synchronous multimedia collaboration sessions at any time, without disrupting the synchronous multimedia collaboration session for other users. In some embodiments, synchronous multimedia collaboration sessions may be based around a particular topic, a particular channel, or a set of users, while in other embodiments, synchronous multimedia collaboration sessions may exist without being tied to any particular channel, topic, or set of users. Synchronous multimedia collaboration sessions may be short, ephemeral sessions from which no data is persisted. Alternatively, in some embodiments, synchronous multimedia collaboration sessions may be recorded, transcribed, and/or summarized for later review. Members of a particular synchronous multimedia collaboration session can post messages within a messaging thread associated with that synchronous multimedia collaboration session that are visible to other members of that synchronous multimedia collaboration session together with other messages in that thread. The "multimedia" in a synchronous multimedia collaboration session may include any or all of audio, video, screen sharing, collaborative document editing, whiteboarding, co-programming or any other form of media. A synchronous multimedia collaboration session may be started for a particular channel or direct message conversation by one or more members of that channel or direct message conversation. For example, a user may start a synchronous multimedia collaboration session in a channel as a means of communicating with other members of that channel who are presently online. The user may have an urgent decision and want immediate verbal feedback from other members of the channel. Starting a synchronous multimedia collaboration session allows the user to start an immediate audio conversation with other members of the channel without requiring scheduling.

Communication data within a group-based communication system may include messages, queries, files (e.g., documents, spreadsheets, computer code, images, video, audio, and/or electronic contact information), mentions, users or user profiles, interactions (e.g., reactions, edits, deletions, and/or prioritizations such as by pinning or starring), tickets, channels, applications integrated into one or more channels, conversations (e.g., groups of messages that have been segmented as single units), workspaces (e.g., sets of channels, users, projects, tasks within an organization that may have their own sets of permissions and that may be organized substantially in line with an organization chart in some instances) or other data generated by or shared between users of the group-based communication system that are associated with an organization's communication data using the group-based communication system.

In some instances, the communication data may comprise data associated with a user (e.g., a user profile), including, but not limited to, a user identifier, one or more communication channel identifiers associated with communication channels to which the user has been granted access, one or more group identifiers for groups (or organizations, teams, entities, or the like) with which the user is associated, an indication of whether the user is an owner or manager of any communication channels, an indication of whether the user has any communication channel restrictions, a plurality of messages, a plurality of emoji, a plurality of conversations, a plurality of conversation topics, an avatar, an email address, a real name (e.g., Austin Author), a username (e.g., austin_a), a password, a job title, a skill set, user preferences and/or settings, a time zone, a status, a token, and other user-specific information. In some embodiments, the group-based communication system may additionally or alternatively store permissions data associated with permissions of individual users of the group-based communication system. In some embodiments, permissions associated with an individual user can be mapped to, or otherwise associated with, an account or profile associated with user data. Permissions can indicate which users can communicate directly with other users, which channels a user is permitted to access, restrictions on individual channels, which workspaces the user is permitted to access, and restrictions on individual workspaces, for example. In some embodiments, the permissions can support the group-based communication system by maintaining security for limiting access to a defined group of users. In some such embodiments, such users can be defined by common access credentials, group identifiers, or other criteria, as described above.

In some embodiments, the group-based communication system can be partitioned into different workspaces, which can be associated with different groups of users. Each workspace can be associated with a group identifier and one or more user identifiers can be mapped to, or otherwise associated with, the group identifier. Users corresponding to such user identifiers may be referred to as "members" of the group. A workspace may comprise one or more channels that are unique to that workspace and/or one or more channels that are shared between one or more workspaces. In some embodiments, workspaces can be associated with one or more organization identifiers, which can be associated with organizations or other entities associated with the group-based communication system. In some embodiments, such data can be mapped to, or otherwise associated with, other types of data (e.g., user data, permission data, or channel data).

The subject matter of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claimed invention. Terms should not be interpreted as implying any particular ordering of various steps described unless the order of individual steps is explicitly described.

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Operational Environment for Embodiments of The Invention

FIG. 1A illustrates an exemplary hardware platform for certain embodiments of the invention. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple buses, or components may communicate with each other directly. Central processing unit (CPU) 106 is connected to system bus 104. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments, no display is present, while in others it is integrated into computer 102. Similarly, peripherals such as keyboard 118 and mouse 120 are connected to system bus 104. Like display 116, these peripherals may be integrated into computer 102 or absent. In some embodiments, additional peripherals such as a microphone or video camera may also be present and connected to system bus 104. In some embodiments, such peripherals may be detachable connected to computer 102 via a wired or wireless connection. In other embodiments, such as a tablet or smartphone, these peripherals are integrated into computer 102. Also connected to system bus 104 is local storage 122, which may be any form of computer-readable media and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, BLUETOOTH, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 1B:
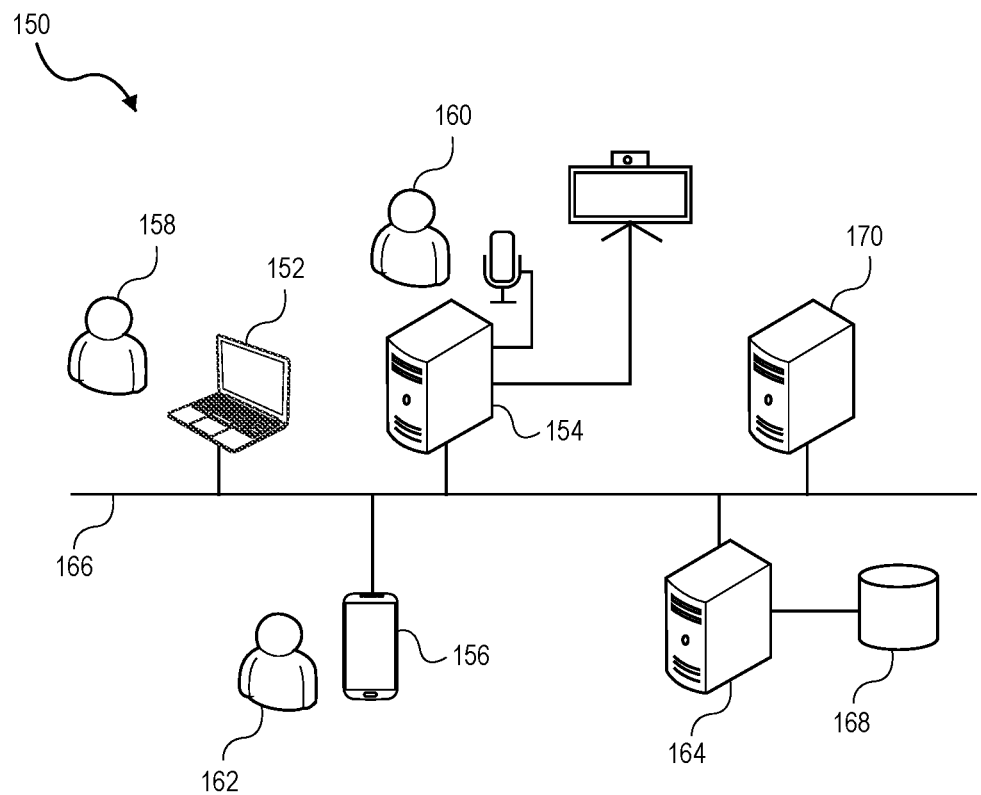
FIG. 1B depicts an exemplary diagram illustrating components of a system for carrying out embodiments of the invention.

FIG. 1B illustrates elements of a system 150 for carrying out embodiments of the invention. System 150 includes any number of client devices such as client device 152, client device 154, and client device 156 associated with user 158, user 160, and user 162 respectively. Although system 150 is depicted with one client device per user, an individual user may connect to the group-based communication system using multiple client devices, either concurrently or sequentially. Similarly, in some embodiments, multiple users may share (concurrently or sequentially) a single client device to access the group-based communication system. As depicted in FIG. 1B, client devices may be any form of computing device discussed above with respect to FIG. 1A. In particular, a user may access the group-based communication system using a desktop, a laptop, or a mobile device. The group-based communication system may be accessible via dedicated software of the client device or via the web browser of the client device. In some embodiments, channel administrators can access administrative functionality via any client device. In other embodiments, administrative functions can only be accessed from a limited subset of client devices (for example, only via client device 152). In some embodiments, the group-based communication system is a channel-based messaging platform.

The group-based communication system is hosted by group-based communication system server 164. Group-based communication system server 164 may be a dedicated server, a shared server, a virtual machine instance in a cloud computing environment, or any other form of computing device discussed above with respect to FIG. 1A. Although a single group-based communication system server 164 is depicted, embodiments with multiple such group-based communication system servers are also contemplated so as to provide scale, redundancy and/or isolation between different instances of the group-based communication system. For example, a software development company may not wish to have its group-based communications system hosted on the same server as a competitor's group-based communication system for security reasons. Group-based communication system server 164 is communicatively coupled to client devices 152, 154, and 156 via network 166. Network 166 may be a local area network (LAN), wide-area network (WAN), virtual private network (VPN) or the Internet. Broadly speaking, any type of network for providing communication between the various components of system 150 is contemplated. Group-based communication system server 164 may provide web server functionality to enable web-based clients and non-web server functionality to enable clients using a dedicated app. Alternatively, both web-based clients and dedicated-app clients might both use a single web server, or the web server might be a gateway providing web-based access to the dedicated-app server. Other techniques for enabling communication among various types of client application are also contemplated.

Group-based communication system data store 168 is communicatively connected to group-based communication system server 164. As depicted, group-based communication system data store 168 is directly connected to group-based communication system server 164; however, any form of communicative connection (for example, network-attached storage (NAS), a network file system (NFS), or cloud-based storage) can be employed. Broadly speaking, group-based communication system data store 168 stores all of the durable information used by group-based communication system server 164. For example, group-based communication system data store 168 may store all of the messages with their associated channels, documents and images uploaded to particular channels, channel membership information, and/or user information. In some embodiments, collaboration sessions may be archived and stored on the group-based communication system data store 168 for subsequent retrieval. As previously discussed, multiple group-based communication system servers may be present in system 150. In such embodiments, each group-based communication system server may have its own copy of group-based communication system data store 168. Alternatively, multiple group-based communication system servers may share a single network-attached group-based communication system data store. Alternatively, or in addition, in any of these embodiments, data may be sharded across multiple group-based communication system data stores.

Real-time media server 170 is also communicatively coupled to group-based communication system server 164 and client devices 152, 154 and 156. Real-time media server manages the multimedia aspects of real-time multimedia collaboration sessions among users of the group-based communication system as described in additional detail below. The term "multimedia" is used in this specification for brevity; however, it should be understood that the term used herein contemplates audio-only streams, video-only streams, audio/video streams, or any other combination of one or more media streams.

As depicted, the communication between real-time media server 170 is via network 166. In some embodiments, however, the real-time nature of collaboration sessions may be better served by connecting via a different network for part or all of the communicative coupling. For example, a particular client device may normally connect to group-based communication system server 164 via a cellular data connection but switch to a WiFi connection when a multimedia collaboration session begins to accommodate an additional demand for bandwidth. In some embodiments, client devices may communicate multimedia collaboration data with each other via real-time media server 170 using a hub-and-spoke configuration. In other embodiments, client devices may communicate with each other directly using a peer-to-peer or supernode architecture. In still other embodiments, client devices on the same network may communicate with each other using multicast network protocols such as IP multicast. In yet other embodiments, media communication between the client devices may be via an edge-based scaling content distribution network.

Figure 2A:
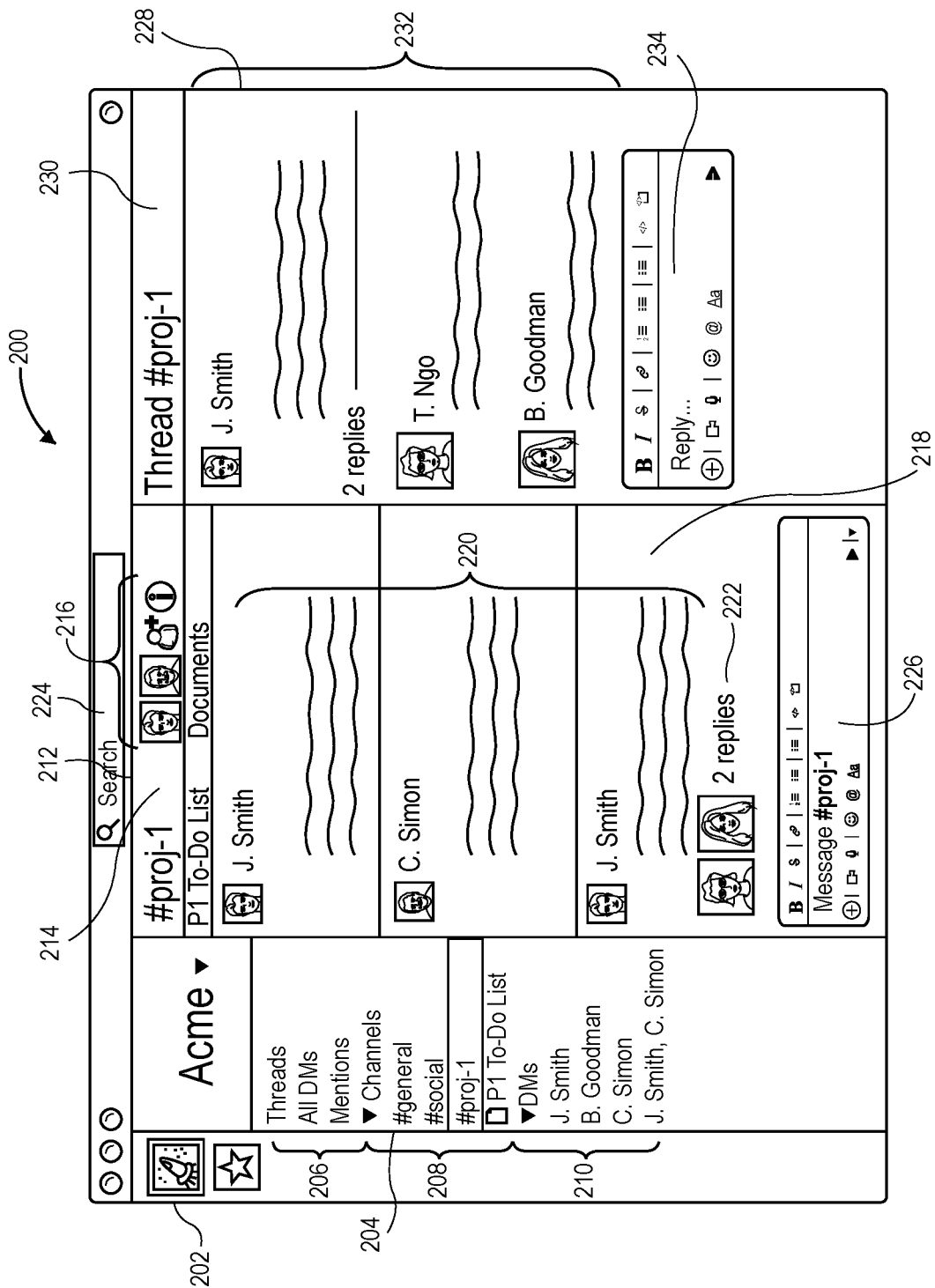
FIG. 2A depicts a user interface for the group-based communication system for certain embodiments.

FIG. 2A illustrates a user interface 200 of a group-based communication system, which will be useful in illustrating the operation of various embodiments, as discussed in further detail below. Broadly, user interface 200 comprises a plurality of objects such as panes, text entry fields, buttons, messages, or other user interface components. As depicted, user interface 200 comprises workspace pane 202; channel list pane 204, which comprises quick info list 206, channel and document list 208 and direct message list 210; channel pane 212, which comprises channel header 214, channel controls 216, channel display 218, messages 220, and thread reply preview 222; search pane 224; compose pane 226; and thread pane 228.

As depicted, user interface 200 includes workspace pane 202 for navigating between various workspaces in the group-based communication system. In some embodiments, the group-based communication system can be portioned into different workspaces, which can be associated with different groups of users. Each workspace can be associated with a group identifier and one or more user identifiers can be mapped to, or otherwise associated with, the group identifier. Users corresponding to such user identifiers may be referred to as "members" of the group. For example, a user may be a part of a workspace for a job at Acme Software Engineering. The user may also be a member of a local volunteer organization that also uses the group-based communication system to collaborate. To navigate between the two groups, the user may use workspace pane 202 to change from the Acme workspace to the volunteer organization workspace. A workspace may comprise one or more channels that are unique to that workspace and/or one or more channels that are shared between one or more workspaces. For example, the Acme company may have a workspace for Acme Software Engineering projects, a workspace for Human Resources, and an additional workspace for general company matters. In some embodiments, workspaces can be associated with one or more organizations or other entities associated with the group-based communication system.

Users may navigate between channels using channel list pane 204. Channel list pane 204 may comprise quick info list 206 comprising various links for a user to quickly access portions of the group-based communication system. For example, as depicted, quick info list 206 comprises threads, Direct Messages (DMs), and mentions/reactions. Each of the items in quick info list 206 may be bolded, italicized, highlighted, boxed, animated, or otherwise called out to indicate the presence of unread items or items otherwise of interest. Clicking on the threads link in quick info list 206 may cause the display of all threads in which the user has participated, while clicking on the DMs list may cause the display in user interface 200 of all the direct messages in which the user is involved. Quick info list 206 may be configurable by the user to add various links to areas of the group-based communication system for quick access, such as a link to view all files shared within the group-based communication system. Channel list pane 204 may also comprise channel and document list 208 listing all channels and documents to which the user has subscribed to or to which the user has been granted access. In some embodiments, channel list pane 204 further includes direct message list 210. Direct message list 210 comprises a list of messages sent from a user directly to another user of the group-based communication system, which may be displayed in channel pane 212 when selected. Direct messages may be sent to one other user or to any number of users.

User interface 200 may further comprise channel pane 212 that displays information related to the currently displayed channel. In some embodiments, within the group-based communication system, communication may be organized into "channels," each channel dedicated to a particular topic or set of users. For example, Acme Software Engineering company utilizing the group-based communication system may have a channel #general to discuss general company matters and a #proj-1 channel to discuss a live project. Teams within the software engineering firm may have their own channels as well, such as a #devops channel for a DevOps team. Members of a particular channel can post messages 220 within that channel that are visible to other members of that channel together with other messages 220 in that channel. In some embodiments, or for certain selected channels, messages 220 may be visible only to channel members; in other embodiments or for other channels, non-members of a channel may be able to preview messages 220 in a channel without joining. Users may select a channel for viewing in order to see only those messages 220 relevant to the topic of that channel without seeing messages 220 posted in other channels on different topics.

Channel pane 212 may also include channel header 214, which may display metadata for the currently selected channel, including channel name, channel membership, and channel topic. Channel header 214 may also display channel controls 216 for viewing members of the channel, inviting a new member to the channel, viewing information about the channel, or other channel-related functions. User interface 200 may also include search pane 224. Search pane 224 may allow users to search for content located in the current workspace of the group-based communication system, such as files, messages 220, channels, members, commands, functions, and the like. In some embodiments, video collaboration sessions, excerpted video, and collaboration containers may be searched, as discussed in further detail below.

As previously mentioned, channel pane 212 may also include compose pane 226. Compose pane 226 allows users to compose and transmit messages 220 to the members of the channel. Compose pane 226 may have text editing functions such as bold, strikethrough, and italicize. Compose pane 226 may also allow users to format their messages 220 or attach files such as, but not limited to, document files, images, videos, or any other files to share the file or files with other members of the channel.

In some embodiments, conversations in channels may further be broken out into threads. Threads may be used to aggregate messages 220 related to a particular conversation together to make the conversation easier to follow and reply to. For example, a user, J. Smith, in the channel #proj-1 may ask a question pertaining to a specific company policy. Another member of the channel may decide to reply to J. Smith in a thread to keep the conversation grouped together and to keep the response from getting lost in the channel. Under the message 220 to which a user has replied appears thread reply preview 222. Thread reply preview 222 may show information related to the thread, such as, for example, the number of replies and the members who have replied. Thread replies may appear in thread pane 228 that may be separate from channel display 218 in channel pane 212 and may be viewed by other members of the channel by selecting thread reply preview 222 in channel display 218.

In some embodiments, thread pane 228 comprises thread header 230 that may display the channel the thread is associated with. Thread pane 228 also may include scrollable thread display 232 that displays each message sent in the history of the thread. Users participating in the thread may also reply directly to the thread using thread compose pane 234. Thread compose pane 234 may be positioned within thread pane 228 where a user can compose and transmit a reply to the messages in the thread. In some embodiments, thread compose pane 234 shares the features of compose pane 226.

Figure 2B:
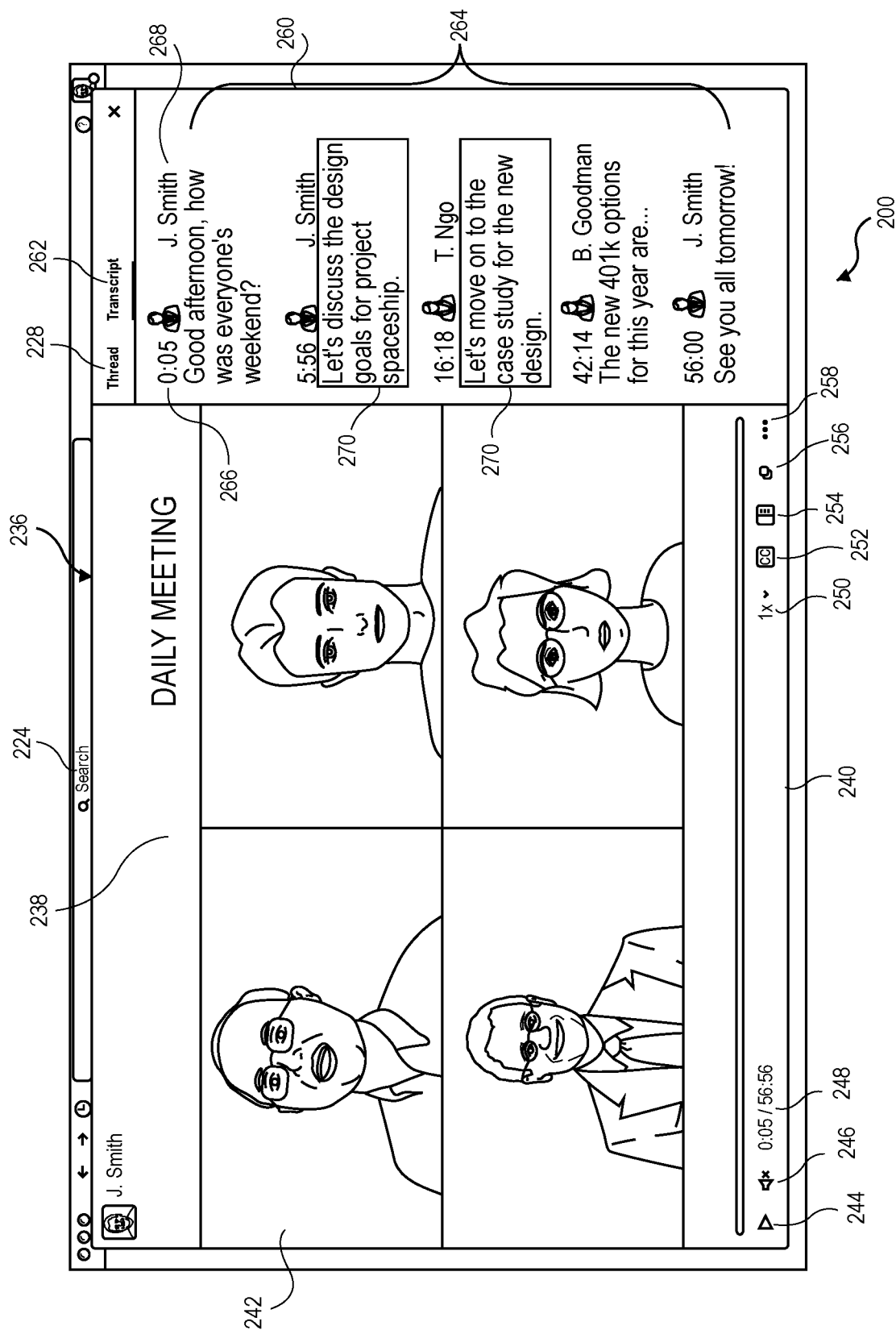
FIG. 2B depicts a video interface for the group-based communication system for certain embodiments.

FIG. 2B illustrates a video interface 236 for the group-based communication system for some embodiments. As described above, video collaboration sessions may be displayed in video interface 236. Video collaboration sessions may be hosted by the group-based communication system and/or may be provided from a third-party application integrated within the group-based communication system. Group-based communication members may participate in synchronous, asynchronous, and/or hybrid video collaboration sessions. For example, a software development team may host a synchronous video collaboration session for a daily stand up meeting and team members may post video status updates asynchronously to the group-based communication system. In some embodiments, videos are displayed directly in channels or direct messages of the group-based communication system. As discussed below, users may generate an excerpted video from one or more videos. The excerpted video may comprise portions from the one or more videos. Thus, the excerpted video may be viewed asynchronously and provides a more time-efficient manner for sharing information than traditional synchronous meetings. In some embodiments, users are distinguished between creating users who provide inputs for generating excerpted videos and collaboration containers and viewing users who view the excerpted videos and collaboration containers. A user may be both a creating user and a viewing user.

As depicted, video interface 236 may be overlaid on user interface 200. In some embodiments, video interface 236 may be resized and/or repositioned to various portions of user interface 200. For example, video interface 236 may be docked in a corner of user interface 200 such that the user can view and interact with other portions of the group-based communication system while simultaneously viewing video interface 236. Alternatively, or additionally, video interface 236 may be displayed in a window separate from user interface 200. Video interface 236 may comprise a header 238, controls bar 240, and video display 242. Header 238 may display various details relating to the video collaboration session. In some embodiments, header 238 displays a meeting title, a meeting duration, a meeting creator, a meeting agenda (or a link thereto), participating users, an associated channel or direct message, and the like.

Controls bar 240 may comprise various controls for the viewing user to adjust the display of the video collaboration session. Different controls may be displayed during the playback of the collaboration session and the collaboration session itself. For example, during a collaboration session, controls bar 240 may include camera and microphone toggles, gallery/speaker display modes, and similar live collaboration controls.

By contrast, after a collaboration session, controls bar 240 may comprise playback controls such as a play/pause button 244, a volume control 246, a time indicator 248, a playback speed control 250, a closed caption toggle 252, a sidebar control 254, a display control 256, an additional options control 258, or any combination thereof. Play/pause button 244 may be actuated by the viewing user to play and pause the video. Volume control 246 may provide a slider or other control to adjust the volume of the video collaboration session. Time indicator 248 may indicate the current time of the video being played. Playback speed control 250 may provide various options for adjusting the playback speed of the video. Users may choose to slow down the speed to half of the original speed or double the speed to more quickly view the video collaboration session, for example.

Time controls may appear both during and after a collaboration session. For example, closed caption toggle 252 may be toggled by the viewing user to toggle closed captioning on and off. Sidebar control 254 may toggle the display of a sidebar pane 260. In some embodiments, sidebar pane 260 displays one of thread pane 228 or a transcript pane 262. Display control 256 may allow the viewing user to adjust the display of the video collaboration session. In some embodiments, display control 256 allows the viewing user to open the video collaboration session in a separate window or to dock the video collaboration session in a portion of user interface 200 as described above. An additional options control 258 may display additional controls for the video collaboration session upon actuation by the viewing user. For example, additional options control 258 may allow the viewing user to view transcript pane 262, view thread pane 228, view video collaboration details (e.g., creating user, creation timestamp, etc.), download the video collaboration session, share the video collaboration session to a different area (e.g., channel or direct message) of the group-based communication system, copy a link to the video collaboration session, save the video collaboration, delete the video collaboration session, or any combination thereof.

Sidebar pane 260 may further comprise transcript pane 262. Users may toggle between sidebar pane 260 displaying thread pane 228 or transcript pane 262. In some embodiments, thread pane 228 and transcript pane 262 may be displayed side-by-side. Transcript pane 262 may display a transcript 264 of the video collaboration session as shown. Transcript 264 may be generated substantially in real-time or may be generated after the completion of a video collaboration session. Transcript 264 may comprise timestamps 266. In some embodiments, a timestamp 266 is provided each time the speaker 268 changes, provided periodically, provided for every sentence, or provided based on any other criterion or criteria. In some embodiments, a timestamp 266 may be selected to begin video playback at the time associated with the timestamp 266.

As described above, the creating user may select sections 270 of the transcript 264 for creating the excerpted video. In some embodiments, the creating user may highlight sections 270 of the transcript 264 and/or indicate a time period as a section 270 for addition into the excerpted video. A section 270 of transcript 264 may correspond to a portion of the video collaboration session. As discussed below, sections 270 may be leveraged to determine topics for the excerpted video. For example, the topic for the section 270 highlighted at 5:56 may be determined to be "project spaceship," and the topic for the section 270 highlighted at 16:18 may be "the case study" based in part on the usage of the terms in transcript 264.

As described above, thread pane 228 may display any messages or other content shared within the video collaboration session. In some embodiments, video collaboration session participants can create polls, share links, share files, and other like communication data during the video collaboration session. When a viewing user is watching a recording of the video collaboration session, communication data shared via thread pane 228 may be played back along with the recorded video. In some embodiments, communication data within thread pane 228 is interactable during playback. For example, a poll may be created during a video collaboration session to vote on the team's next happy hour spot. A team member absent from the video collaboration session may be able to vote on the poll when watching the video collaboration session or an excerpted video created therefrom at a later time. Alternatively, or additionally, the creating user may specify that communication data from the video collaboration session is non-interactable for the excerpted video. In some embodiments, a timer may be set for interacting with communication data such that upon expiration of the timer interactable aspects of the excerpted video become non-interactable. Similarly, it is contemplated that specific communication data may be set as interactable while other communication data may not be interacted with. For example, the creating user may prevent viewing users from interacting with a poll conducted during the video collaboration session in order to preserve the results of the poll. However, users may be able to interact with messages sent in thread pane 228 during the video collaboration session such that viewing users can, for example, reply to the messages in the excerpted video.

Figure 2C:
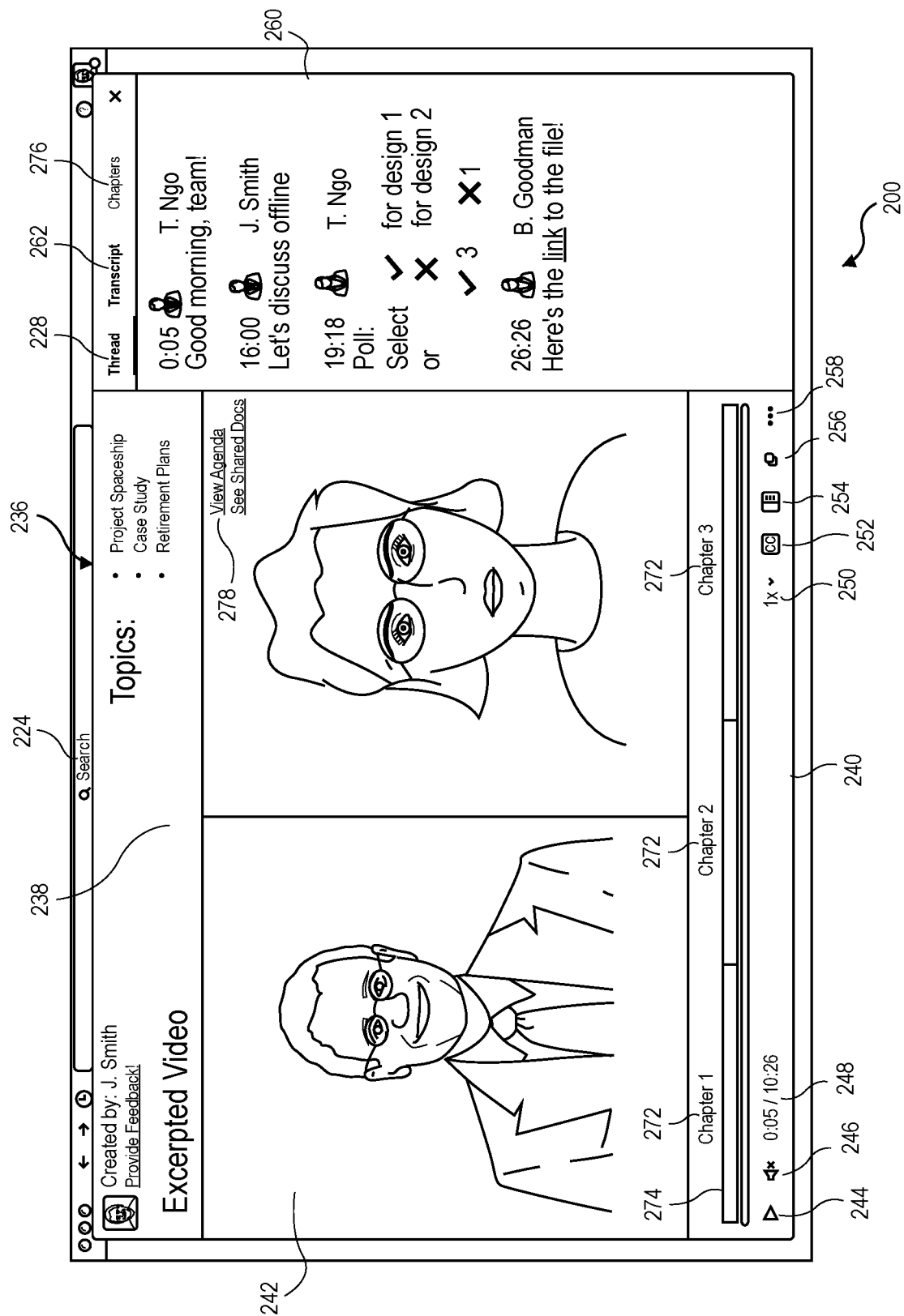
FIG. 2C depicts a video interface for an excerpted video for the group-based communication system for certain embodiments.

FIG. 2C illustrates video interface 236 for an excerpted video for some embodiments. Where common features or elements are unchanged, they are not discussed separately from their discussion with respect to FIGS. 2A-2B.

Header 238 may further display information associated with the excerpted video. For example, header 238 may indicate from which video collaboration session(s) the excerpted video was generated and may link to a full (un-excerpted) video of the collaboration session. Header 238 may also display associated channels, associated users, associated speakers, and the like. Additionally, topics covered by the excerpted video and/or the creating user may be indicated in header 238. In some embodiments, the information in header 238 is determined automatically based in part on sections 270. Alternatively, the creating user may choose which information is displayed in the header 238.

As described above, communication data from the video collaboration session may be persisted as part of the excerpted video. For example, as depicted, messages and polls posted to thread pane 228 during the video collaboration session may be displayed. Viewing users may respond to these messages in the excerpted video. In some embodiments, timestamps for the messages are displayed corresponding to the time in the video collaboration session that the content was shared. Communication data from thread pane 228 may also be leveraged for determining topics for the excerpted video. For example, the depicted poll in thread pane 228 relating to design 1 and design 2 may be used to determine that a section 270 corresponding to the time the poll was posted comprises a topic related to the design 1 and design 2.

The excerpted video may be split into one or more chapters 272. In some examples, a chapter may be a label corresponding to a particular topic. A chapter 272 may be considered a subfile of the synchronous multimedia collaboration session. In some embodiments, sections 270 of transcript 264 may correspond to a chapter 272. In some embodiments, a chapter 272 corresponds to a received multimedia file as discussed below. Each section 270 selected by the creating user may be assigned a corresponding chapter 272. In some embodiments, multiple sections 270 are combined to form a single chapter 272. Alternatively, or additionally, chapters 272 may be separated by topics, speakers 268, time, or by any other separator. Video display 242 may comprise chapters bar 274 displaying information relating to chapters 272. For example, chapters bar 274 may indicate a time length for each chapter 272. Chapters bar 274 may be hovered or otherwise actuated by the viewing user to display additional information, such as chapter titles, chapter descriptions, chapter video previews, and the like. Chapters bar 274 may also be selected to navigate between chapters 272 and initiate playback therefrom. As such, for example, a viewing user may jump directly from chapter 1 to chapter 3 via chapters bar 274.

In some embodiments, chapters 272 are automatically determined based on the selected sections 270. For example, a chapter 272 may be determined based in part on selected sections 270 sharing a similar time frame. If the creating user selects four sections 270 from between the two-minute and five-minute marks of the video collaboration session and three sections 270 from between the twenty-minute and twenty-two minute marks of the video collaboration session, these selected sections 270 may be split into distinct two chapters 272 because it is likely, based on their position in the video collaboration session, they are associated with different topics. Automatically determined chapters 272 may be presented to the creating user for confirmation that sections 270 were correctly allocated to chapters 272, and the creating user may add, delete, reorder, or make any other modifications to the chapters 272.

Chapters 272 may originate from different synchronous multimedia collaboration sessions and/or from distinct multimedia files. For example, a collaboration container may be created responsive to the end of the synchronous multimedia collaboration session illustrated in FIG. 2B. The creating user may create the collaboration container and request other users to add content thereto. A first user may then extract a first portion of a video from the synchronous multimedia collaboration session relating to the discussion on project spaceship and add said first portion to the collaboration container. Meanwhile, a second user may extract a second portion of the synchronous multimedia collaboration session relating to the discussion on the case study for the new design and add said second portion to the collaboration container. Further, a third user may upload a multimedia file comprising an audio voice-over of the third user talking through a related design document for the project design. Lastly, a fourth user may upload a relevant file for the collaboration container. Thus, the collaboration container may then be formed from the four uploaded files. As discussed below, the multimedia files in the collaboration container may be sorted by topic, author, time, length, or the like. As such, as additional multimedia files are added to the collaboration container, the system or the collaboration container may automatically re-sort the files based on the previously used or a new sort order. In some embodiments, the multimedia files are added as a reply to an original multimedia file or message that serves as a starting point for the collaboration container. For example, the creating user may record a video of themselves soliciting feedback relating to the synchronous multimedia collaboration session. The first, second, third, and fourth users may then reply to the video from the creating user in a thread.

As another example for determining chapters 272, transcript 264 may be analyzed and keywords or key phrases determined therefrom. The existence of keywords in sections 270 may be used in part to determine chapters 272 such that sections 270 sharing a keyword or phrase forms a chapter 272. Further, keywords and phrases may be used in part to determine topics for the excerpted video. Chapters 272 may be automatically determined based in part on determined topics. For example, each section 270 may have an associated topic determined therefor. All sections 270 sharing a topic may then be combined to form a chapter 272. As such, a video collaboration session that bounces between topics may be condensed such that specific topics are presented together for the excerpted video. Further, a viewing user may skip certain chapters 272 that are dedicated to topics that are irrelevant to the viewing user as previously described.

In some embodiments, a meeting agenda for a video collaboration session may be received. The meeting agenda may outline topics, such as projects, that the meeting is intended to cover. In some embodiments, the meeting agenda is analyzed together with transcript 264 to determine topics for the excerpted video. In some embodiments, a threshold number of keyword instances is required to consider a keyword as a topic. The threshold may be predefined, or machine learning techniques may be employed to determine an optimal threshold number. Additionally, content shared in thread pane 228 may be leveraged alone or in combination with transcript 264 and the meeting agenda, for topic determination. Other areas of the group-based communication system may be leveraged to determine topics. For example, keywords may be matched between transcript 264 and the channel from which the video collaboration session originated to determine topics.

Various natural language processing techniques may be used in embodiments herein for analyzing transcripts 264 to determine topics, sections 270, chapters 272, and the like. Keywords may be determined using topic segmentation and detection methods such as, but not limited to, hidden Markov models, lexical chains, co-occurrence, clustering, topic modeling, or any combination thereof. As another example, summaries of transcripts 264, sections 270, chapters 272, or any combination thereof may be generated using extractive and/or abstractive summarization. In some embodiments, various machine learning methods, such as the TextRank Algorithm, latent semantic analysis, Luhn's summarization algorithm, the KL-Sum algorithm, or the like may be used to generate summaries. Neural networks, such as recurrent neural networks, concurrent neural networks, long short-term memory networks, self-attention models, or generative adversarial networks may be used alone or in conjunction with embodiments described herein for determining summaries, sections 270, chapters 272, topics, or any combination thereof based on the transcripts 264 generated from video collaboration sessions.

In some embodiments, chapters 272 correspond to individually recorded videos from group-based communication members. An excerpted video may then be created from the combination of individual videos. Thus, for example, rather than holding stand up meetings, team members can record their status updates as individual videos, and these status updates may be compiled to create an excerpted video describing the entire team's status. In some embodiments, the videos are voice-overs of static images and/or screen shares. The team members can then review the excerpted video at their leisure without having to worry about attending a meeting at a specified time. Additionally, because each team member's video may correspond to a specific chapter 272, ease of navigation of the excerpted video is provided as the viewing user can jump to a chapter 272 associated with a specific team member. Further advantages are found when the team comprises members spanning different time zones such that the entire team is generally unavailable at a specific time each day to host a traditional synchronous stand up meeting.

In some embodiments, sidebar pane 260 comprises a chapters pane 276 for the excerpted video. Chapters pane 276 may display details about each of the chapters 272 in the excerpted video. For example, chapters pane 276 may display the above-described information visible in chapters bar 274. Further, chapters pane 276 may display speakers 268, chapter topics, chapter length, chapter summaries, or any other chapter-related detail.

In some embodiments, video display 242 comprises associated content 278. Associated content 278 may comprise links to content associated with the video collaboration session. For example, associated content 278 may comprise a link to a meeting agenda for the video collaboration session and a link to all files associated with the video collaboration session. In some embodiments, associated content 278 comprises a link to the video collaboration session.

As described above, search pane 224 may allow users to search the group-based communication system for a variety of content. In some embodiments, excerpted videos are searchable via search pane 224. Excerpted videos may be searched by topic, by creator, by speakers 268, by channel, by date, or by any other criteria.

In some embodiments, excerpted videos are automatically posted to an area of the group-based communication system based on the content of the excerpted video. For example, if an excerpted video is created from a video collaboration session originating from the channel #proj-1, the excerpted video may automatically be posted to channel #proj-1. Similarly, participants (or a subset thereof) of the video collaboration session may have the excerpted video automatically messaged to them. As another example, if a video collaboration session was created in #proj-1, and the excerpted video generated therefrom, all members of #proj-1 who did not participate in the video collaboration session may have the excerpted video directly messaged to them. As such, members who missed the video collaboration session may be able to catch up on missed discussion. Because sections 270 of the video collaboration session may be selected, asynchronous viewers may watch the excerpted video to learn only the pertinent information while avoiding the bloat often present in traditional synchronous meetings. In some embodiments, the creating user can specify which users and/or which areas of the group-based communication system (if any) the excerpted video is posted to upon creation.

In some embodiments, viewing users can interact with the excerpted video. In further embodiments, a time limit may be placed on interacting with the excerpted video. Interactions with the excerpted video may be communicated to the creating user or any other user. The interactions may persist as subsequent viewing users watch the excerpted video. As one example, viewing users may interact with polls posted during the video collaboration session as described below. Similarly, original polls may be added to the excerpted video by the creating user. For example, when the excerpted video comprises a plurality of individually recorded videos, it may be useful to attach a poll thereto to encourage interactivity and to make decisions without having to host a synchronous meeting.

As another example, viewing users may post comments associated with the excerpted video. For example, viewing users may post messages in thread pane 228 relating to the excerpted video. In some embodiments, a separate thread pane 228 is provided for the excerpted video such that any content shared originally in thread pane 228 for the video collaboration session is kept separate from content shared for the excerpted video. Alternatively, or additionally, viewing users may add comments directly to thread pane 228. As such, viewing users may asynchronously participate in conversation that occurred during the video collaboration session. In some embodiments, if a viewing user replies to a post in thread pane 228, the member associated with the original post in the video collaboration session to which the viewing user replied may be notified of the reply.

In some embodiments, viewing users can directly annotate the excerpted video. The annotations may be displayed in video display 242. In some embodiments, the annotation comprises a sticky note or a reaction. The sticky note may comprise a message pertaining to the content of the excerpted video and may be associated with a specific timestamp 266, section 270, chapter 272, topic, or the like. For example, a viewing user may add a sticky note at a specific time with a link to a document related to the topic being discussed. Additionally, the viewing user may add a sticky note to provide feedback to the discussion at the current time in the video. As such, a subsequent viewing user may see the sticky note pop up in video display 242 when watching the excerpted video. This subsequent viewing user may then edit the sticky note, reply to the sticky note, add their own sticky note, or the like. Further, it is contemplated that the creating user may create prompts, such as text overlays, requesting the viewing user add a sticky note or other annotation to a specified timestamp to solicit viewer feedback. In some embodiments, the prompts allow the viewing user to choose a chapter 272 or topic of the excerpted video to consume next. Thus, each viewing user may have a different viewing experience based on the selected prompts. In some embodiments, viewing users may respond or react to various portions of the excerpted videos. For example, a viewing user may react with a thumbs-up emoji to a chapter 272 to indicate the chapter 272 contained useful information. Similarly, an exclamation point emoji may be used to indicate the importance of a portion of the video for subsequent viewing users. Display of annotations may be toggled via additional options control 258.

In some embodiments, excerpted videos are consumable in an audio-only format. In further embodiments, the excerpted video is downloadable (e.g., via additional options control 258). For example, a viewing user may download the excerpted video in the audio-only format to consume the excerpted video in a format much like a podcast. In some embodiments, the excerpted videos may be synced across devices to harmonize playback. For example, consider that client device 152 is the user's work computer and client device 154 is the user's personal mobile device. The user may begin watching the excerpted video on client device 152 and finish the video via the audio-only format on client device 154. When the excerpted video is paused on client device 152, playback may begin at the pause point on client device 154. In some embodiments, multiple excerpted videos may be added to a queue for automatic playback.

Figure 3:
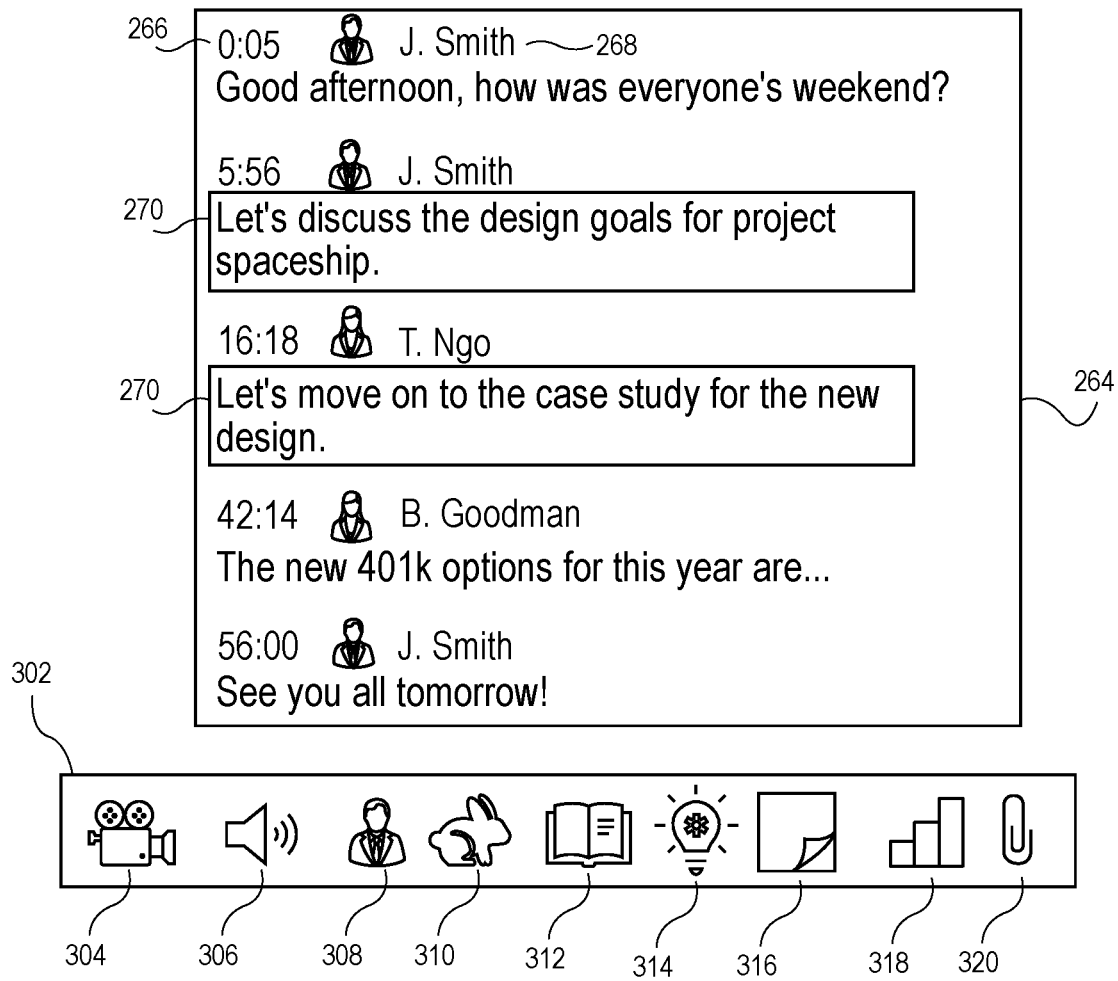
FIG. 3 depicts video production tools for generating excerpted videos for certain embodiments.

FIG. 3 illustrates one exemplary embodiment of transcript 264 and video production tools for generating excerpted videos for some embodiments. Broadly speaking, any interface for performing the disclosed techniques is contemplated as being within the scope of the invention. As described above, creating users may specify sections 270 for creating the excerpted video. In some embodiments, creating users are provided with a toolbar 302 comprising various controls for editing and producing excerpted videos. Toolbar 302 may comprise video editing tool 304, audio editing tool 306, speaker tool 308, playback speed tool 310, chapters tool 312, topics tool 314, transitions tool 316, polling tool 318, attachments tool 320, or any combination thereof. In some embodiments, toolbar 302 is displayed upon the selection of a section 270 by the creating user in user interface 200. Alternatively, or additionally, toolbar 302 may be displayed after all sections 270 have been selected, or at any other time before, during, or after creating excerpted videos.

Video editing tool 304 may comprise various options for editing video portions for the excerpted video. In some embodiments, video display options may be selected for configuring the layout of the video display. For example, the creating user may select between a gallery view, a speaker view, or a current view. The gallery view may comprise displaying all videos at the associated portion of the video collaboration session. The speaker view may comprise displaying the video associated with the speaker 268 of the highlighted section 270. The current view may comprise using the view "as is" from the video collaboration session. As such, in some embodiments, the excerpted video may comprise a different display than the original video collaboration session. For example, if a first user in the video collaboration session is screen sharing a file, and a second user is speaking and talking about the file, the creating user may generate the excerpted video using the video feed from the first user and the audio feed from the second user.

In some embodiments, video editing tool 304 may be used to normalize the videos (or a subset thereof) in the excerpted video. For example, the frame rate and/or resolution may be normalized across all videos. As such, a participant of the video collaboration session having a poor network connection and, as such, a poor video resolution, may have their video upscaled for the excerpted videos. Similarly, other video effects, such as lighting, may be normalized for the excerpted videos. In some embodiments, video normalization and any other video and audio adjustments and enhancements discussed herein are performed automatically by the group-based communication system when creating excerpted videos.

Still further video editing options may be provided via video editing tool 304. For example, the creating user may manually trim the video corresponding to the selected section 270. Additionally, video orientation may be adjusted in some embodiments. In some embodiments, the size of video frames may be scaled. For example, consider that the creating user selected a section 270 corresponding to the video collaboration session at the point illustrated in FIG. 2B wherein four separate video displays form video display 242, but the creating user only wishes to display two of the video displays in the excerpted video. As such, the video frame size of the selected two video displays may be scaled up to encompass substantially the entirety of video display 242. In some embodiments, video scaling is performed automatically to ensure substantially the entirety of video display 242 is utilized for displaying video. In some embodiments, text overlays and/or polls may be added to the selected video portions. For example, the creating user may add a text overlay to provide additional information, to make a correction to a section 270, or to request feedback from viewing users at a specified portion of the excerpted video. In some embodiments, graphics, such as call-outs, may be overlaid on the video. In some embodiments, the creating user selects a frame to use as a thumbnail for the excerpted video. As another example, blurring effects, such as Gaussian blurs, may be applied to video feeds. Similarly, touch-up effects may be applied to videos. Broadly, any post-processing technique is contemplated for embodiments herein to increase the video quality for the excerpted video.

Audio editing tool 306 may provide various options for adjusting the audio of videos for the excerpted video. As one example, the cadence of speakers 268 may be normalized for each speaker 268 in the excerpted video. As such, the speed of speech may be substantially normalized to provide a consistent audio experience. Additionally, the speech speed may be adjusted to either slow down or speed up the cadence of speakers 268. Similarly, the volume may be normalized or otherwise adjusted across the videos to mitigate varying sound levels for the excerpted video. In some embodiments, stop-word filtering may be applied to reduce pauses and filler words, such as "ums," to further reduce the length of the excerpted video and improve the overall video quality.

Speaker tool 308 may be used to indicate speakers 268 for a video portion in the excerpted video. For example, rather than selecting a specific video and audio feed using video editing tool 304 and audio editing tool 306, the creating user may select speakers 268 for the excerpted video. As such, the creating user may specify to pull the video and audio from a first speaker 268 for chapter 1 and a second speaker 268 for chapter 2. In some embodiments, speakers 268 may be selected as sections 270 for the excerpted video such that all portions of transcript 264 associated with a specific speaker 268 are added to the excerpted video. In some embodiments, playback speed tool 310 provides options for adjusting the playback speed of videos for the excerpted video.

In some embodiments, chapters 272 may be created, deleted, and modified via chapters tool 312. As described above, chapters 272 may be defined by the creating user and may be modified and/or reordered. For example, the creating user may define that chapter 1 corresponds to the selected sections 270 existing between the five-minute and the fifteen-minute marks of the video collaboration session. After publishing the excerpted video, the creating user may decide to present chapter 2 first and as such, may swap the ordering of chapter 1 and chapter 2. Thus, excerpted videos may be created having a different chronological order from the video collaboration session. In some embodiments, sections 270 assigned to chapters 272 may be reassigned to different or new chapters 272. Further, the creating user may define a chapter title, chapter description, chapter speaker, chapter title, and the like via chapters tool 312.

As described above, topics may be associated with portions of the excerpted video. In some embodiments, topics may be manually defined via topics tool 314. The creating user may define that a specific time frame, speaker 268, or section 270 is associated with a specific topic, for example. In some embodiments, the creating user may specify a topic as a chapter 272, and transcript 264 may be analyzed as described above to determine which sections 270 of transcript 264 correspond to the specified topic for generating the excerpted video. Thereafter, the relevant sections 270 may be extracted from the video collaboration session and combined to form the chapter 272.

In some embodiments, the excerpted video comprises transitions between or within chapters 272. For example, a transition may be inserted between sections 270 within a chapter 272. Transitions may be automatically determined and/or configured by the creating user via transitions tool 316. The transitions may comprise an inserted music clip or interstitial video, for example. As another example, automatic narration may be employed to announce the beginning of a new chapter 272 and/or an end of the current chapter 272. For example, the chapter title, topic, speaker 268, or any combination thereof may be narrated. In some embodiments, a title slide is automatically generated and displayed between chapters. The title slide may comprise the chapter title, topic, speakers 268, length, associated files, and the like. In some embodiments, the transition comprises a fade to black or any other color to signify the end of a chapter 272. Further, the transition may comprise an option for the viewing user to skip the next chapter 272. A pop-up box may be displayed allowing the viewing user to move to a different chapter 272. In some embodiments, the viewing user can dictate to the group-based communication system to skip a chapter 272.

As described above, video collaboration sessions may be augmented with polls allowing users to vote on a question. Polling tool 318 may allow for the creation and configuration of polls for the excerpted video. In some embodiments, polling options are provided such that viewing users can vote on the ordering of chapters 272, the naming of chapters 272, or other chapter details. For example, as described above, chapters 272 may be automatically determined by the group-based communication system. As such, a polling option or other similar feedback method (e.g., emoji reactions) may be provided allowing users to influence chapters 272 such that an incorrect determination of chapter details may be corrected. In some embodiments, feedback on chapter details is fed to a machine learning model for training to improve the automatic determination of chapters 272. Similarly, in some embodiments, polls may be created for viewing users to provide feedback on automatically determined topics.

In some embodiments, the creating user may configure attachments for the excerpted video via attachments tool 320. In some embodiments, the attachments are displayed as part of associated content 278 as described above. In some embodiments, the excerpted video may comprise associated files or links. Any content shared during the timeframe of a section 270 may be automatically included with the excerpted video. In some embodiments, the creating user can attach content to the excerpted video such that the content is displayed or linked at a specified time. Files may be added directly to the excerpted video using drag-and-drop functionality, for example. In some embodiments, viewing users may add files to the excerpted videos. For example, the viewing user may add a file link to a sticky note annotation that is persisted for subsequent viewing users. Files may be displayed as a snapshot and/or as a link to the actual file.

Figure 4:
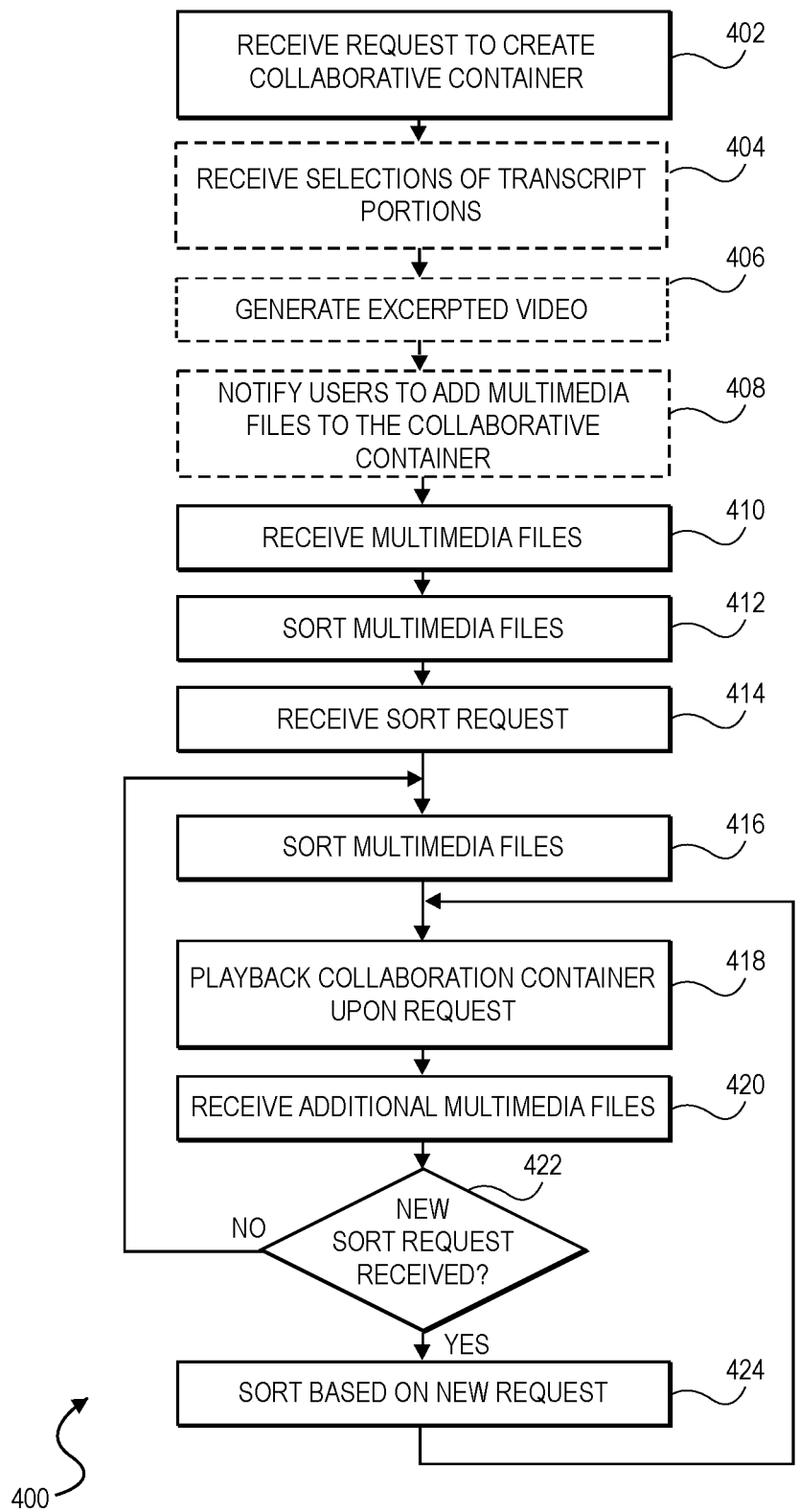
FIG. 4 depicts an exemplary method for creating a collaboration container for certain embodiments.

FIG. 4 illustrates an exemplary method 400 for creating a collaboration container for some embodiments. As described above, collaboration containers may comprise various multimedia files, including excerpted videos and/or subfiles (i.e., chapters 272) thereof. The multimedia files may also comprise a voice-over of a static image, a collaborative document, or a link, for example. In some embodiments, the multimedia files are individually recorded videos. In further embodiments, the multimedia files originate externally from the group-based communication system such that non-members of the group-based communication system may contribute to the collaboration container. Additionally, external multimedia files, such as a video tutorial or lecture, may be received for addition into the collaboration container. Broadly, any type of multimedia file is contemplated for addition into the collaboration container.

At step 402, a request to create the collaboration container may be received. In some embodiments, the request to create the collaboration container comprises the submission of a first multimedia file as an original multimedia file. The collaboration container may then comprise multimedia files received in response to the original multimedia file. Alternatively, or additionally, the posting of a group-based communication object, such as a message or file, may be used as an original multimedia file for the collaboration container. Still further, the collaboration container may be created based on a selection of already-posted multimedia files.

In some embodiments, the plurality of multimedia files in the collaboration container are combined to form a single, master (or "primary") video. Users may add additional multimedia files to the master video at specific timestamps thereof. If two multimedia files are added to the master video at substantially the same timestamp, user feedback may be used to determine which video to add to the master video. For example, emoji reactions may be leveraged when determining which multimedia file to keep in the master video.

Alternatively, a file from a user having a certain role within the organization (e.g., a higher level project manager) may be added to the container.

At optional step 404, selections of the sections 270 of the transcripts 264 may be received. In some embodiments, less than all of the transcript 264 is selected. In some embodiments, the creating user highlights or otherwise selects sections 270 of transcript 264 for use in the excerpted video. In some embodiments, the creating user selects a time range from the video collaboration session as a section 270. Alternatively, or additionally, the creating user may select an entire video as a portion, such as when combining individual videos. The creating user may also indicate an order in which to add the videos to the excerpted videos. The order may be chronological, by topic, by speaker 268, or based on any other criteria.

At optional step 406, the excerpted video may be generated. The excerpted video may be generated by combining each video portion associated with the section 270 of transcript 264 received from the creating user as described above. Additionally, the excerpted video may be generated according to various settings configurable via toolbar 302. The settings may be user-defined, automatically determined, based on presets, or any combination thereof. In some embodiments, the creating user selects one or more display layouts for the excerpted video. For example, the creating user may choose to have a gallery view for chapter 1 and a screen share mode for chapter 3.

At optional step 408, users may be notified to add multimedia files to the collaboration container. In some embodiments, the request to create the collaboration container initiates a prompt to a set of users to add a multimedia file to the collaboration container. For example, the creating user may elect to notify all users in an associated channel to upload a multimedia file to the collaboration container. As another example, all users associated with a synchronous multimedia collaboration session may be notified to upload a multimedia file. As yet another example, all users who viewed the original multimedia file may be prompted to add a multimedia file for the collaboration container. If the prompted users do not upload a multimedia file after a preset amount of time, the users may be sent one or more reminder prompts. In some embodiments, the creating user sets one or more parameters for the multimedia files. The parameters may be provided to the user with the prompt. For example, the creating user may specify that all videos are to be less than one minute long. When a user adds a multimedia file exceeding a time length parameter, the user may be prompted to select one or more portions from the multimedia file (e.g., using toolbar 302) that meet the time requirement. Additionally, a minimum and/or maximum number of multimedia files for the collaboration container may be specified. If a user attempts to add a multimedia file that exceeds a maximum file limit, a multimedia file may be removed based on the popularity thereof. For example, the multimedia file with the least number of clicks or views may be removed from the collaboration container. In some embodiments, the adding user is prevented from adding multimedia files once a file limit is reached.

At step 410, multimedia files may be received for addition into the collaboration container. The multimedia files may be received from multiple different users and may originate from various sources. For example, a first multimedia file may be added by a first user and extracted from a first synchronous multimedia collaboration session, and a second multimedia file may be added by a second user and may be a voice-over of a static image. In some embodiments, chapters 272 of an excerpted video may be uploaded separately to the collaboration container. Users may edit multimedia files using the above-described toolbar 302. The multimedia files may be posted in threads as a reply to a message (e.g., a message comprising the original multimedia file) or in a channel as a distinct top-level message. Each multimedia file may be associated with an uploading user. In some embodiments, users can vote on or react to posted multimedia files. For example, users may react with a thumbs up emoji to a multimedia file indicating their agreement with the content of the video.

At step 412, the multimedia files may be stored in association with the collaboration container. Each multimedia file may be associated with a timestamp 266 as described above. The order in which the multimedia files are stored may be referred to as the storage order. The storage order may be the chronological order from which the multimedia files were received.

At step 414, a sort command for the collaboration container may be received. The sort command may indicate a sort order for sorting the multimedia files in the collaboration container, and in embodiments, the sort order may be based on one or more labels applied to each multimedia file. When adding multimedia files to the collaboration container, the uploading user may indicate one or more labels for the multimedia files, or the file labels may be automatically determined as described above. The sort command may instruct to sort the multimedia files by one or multiple labels, where exemplary labels include a topic, a chronological order, in reverse chronological order, by length of the multimedia file, by a role, status, or other indicia of an uploading user, by reactions or indicated popularity (e.g., files having a positive user response or "liked" or "favored" will be sorted higher), by file type, by threads, by channel, by the person or persons speaking within the video, by any associated files or documents that are linked to the video, or by videos having the same or similar file lengths together. The popularity may also be based on the number of views or clicks on a file and/or on a number of replies or comments on a file. In some embodiments, the multimedia files are automatically sorted or filtered by access level such that multimedia files to which a requesting user does not have access to are not played back to the user. As one example of sorting multimedia files, all multimedia files in a first thread may be grouped into a first group, which in embodiments may be grouped in the first group responsive to a first label, and all multimedia files in a second thread may be grouped into a second group (again, in embodiments responsive to a second label). Multimedia files posted to other areas of the group-based communication system may also be grouped, such as multimedia files shared to a channel, a workspace, or a synchronous multimedia collaboration session. As another example, all excerpted videos may be grouped together in a first group and all individually recorded videos may be added to a second group.

In some embodiments, the multimedia files are sorted based on an associated user. The associated user may be the user adding the multimedia file to the collaboration container and/or a user appearing in the multimedia file. For example, all multimedia files posted by a designated user (e.g., a project manager, a channel administrator, etc.) may be grouped together. As another example, users may be grouped based on their work teams. When multiple teams are collaborating to create a collaboration container, the multimedia files received from the users may be separated by teams. Still further, the multimedia files may be analyzed to determine one or more speakers 268. For example, a junior software engineer may add an excerpted video from a synchronous multimedia collaboration session to the collaboration container. The excerpted video may comprise the engineer's project manager speaking about the project. Therefore, this excerpted video may be grouped with a video uploaded by the project manager when sorting multimedia files. In some embodiments, the associated user is determined based on interactions with the viewing user. For example, all multimedia files associated with the users the viewing user has recently engaged in a direct message or thread with may be grouped together.

Multimedia files associated with one or more other files may be sorted together. For example, a first user may add an excerpted video containing a link to a file posted during a portion of the excerpted video to the collaboration container. A second user may then add the file itself as a multimedia file to the collaboration container. Thus, the excerpted video may be grouped with the file. Similarly, an excerpted video may be grouped with any document that was displayed and/or worked on during the course of the excerpted video.

In embodiments, the system may automatically compile or otherwise associate two or more multimedia files. For example, a first multimedia file may be a video or static image. A second multimedia file may be a voice over (e.g., a narration) from a user relative to the video or static image, such as the user commenting on the first multimedia file. Embodiments automatically associate the first and second multimedia files together, including providing associated like labels if not otherwise provided. Yet further, embodiments merge, compile, or otherwise associate the multimedia files together, such that during playback, the files are played together or in some ordered fashion relative to each other. In one embodiment, the first and second multimedia files are automatically associated together based on recognizing a transcript from an audio of the first multimedia file (when it is a video) relates to a similar topic to the voice over transcription for the second multimedia file. In another embodiment, the first and second multimedia files are automatically associated together based on the label for each file. In yet further embodiments, the multimedia files are associated together by manual selection from the user, such as manually labeling each file with a like label or otherwise selecting the files to be associated with each other.

The system may allow a user to provide a designated label for the sort command, or the system may provide predetermined label options from which the user may select for the sort command. In some embodiments, users may indicate two or more sort labels that are required for sorting videos. For example, the user may sort the multimedia files to only view files dedicated to a specific topic and associated with a specific user. Yet further, the system may identify sort command options for presenting for selection by the user based on an analysis of key topics currently of interest to the organization, including use of machine learning or artificial intelligence techniques described above. Thereafter, at step 416, the multimedia files may be sorted according to the sort command.

At step 418, the collaboration container may be played back upon request. The playback request may be received via user interface 200. The playback request may comprise a selection of only a portion of the multimedia files in the collaboration container. For example, the user requesting playback may request a sort order to only view multimedia files related to a specific topic. As such, the user may view only the desired content in the updated sort order. Thus, the bloat of traditional synchronous meetings is omitted because users are able to view content that is relative to them. In some embodiments, the user can leave a comment on a portion of the collaboration container. The comment may then be persisted and stored with the collaboration container for subsequent users. For example, the user may leave a comment containing a link associated with a multimedia file. When a subsequent user watches the multimedia file in the collaboration container, the link may be displayed at the point the user added the link. Thus, the collaboration container may evolve over time as users add content thereto.

At step 420, additional multimedia files may be received for the collaboration container. The additional multimedia files may comprise any of the above-described files for the collaboration container. Next, at test 422, a determination may be made if a new sort request was received. In some embodiments, the multimedia files are automatically re-sorted when additional multimedia files are added to the collaboration container. The multimedia files may be re-sorted based on a most-recently used sort order. If a new sort request is received, at step 424, the multimedia files may be re-sorted based on the new sort request. Thereafter, processing may proceed back to step 418. If a new sort request is not received, processing may proceed back to step 416 and the multimedia files, including the additional multimedia files, may be re-sorted based on the most-recently used sort order.

Although the invention has been described with reference to the embodiments illustrated in the attached drawing figures, it is noted that equivalents may be employed and substitutions made herein without departing from the scope of the invention as recited in the claims.

The invention claimed is:

1. One or more non-transitory computer-readable media storing computer-executable instructions that, when executed by a processor, perform a method for creating a collaboration container, comprising:
   receiving a first request to create the collaboration container, wherein the collaboration container contains a collection of multimedia files;
   receiving a plurality of multimedia files, wherein a first multimedia file of the plurality of multimedia files is received from a first user, and a second multimedia file of the plurality of multimedia files is received from a second user of a group-based communication system, wherein the first multimedia file corresponds to a first portion of a first synchronous multimedia collaboration session and the second multimedia file corresponds to at least a second portion of the first synchronous multimedia collaboration session or a second synchronous multimedia collaboration session, wherein the first synchronous multimedia collaboration session or the second synchronous multimedia collaboration session is initiated within a communication channel of the group-based communication system and that facilitates at least one of audio communications or video communications between multiple users that are each members of the communication channel;
   determining that the first portion corresponds to a first section of a first transcript of the first synchronous multimedia collaboration session;
   determining that the second portion corresponds to a second section of a second transcript of the first synchronous multimedia collaboration session or the second synchronous multimedia collaboration session;
   associating the first section of the first transcript with a first time period corresponding to the first portion and associating the second section of the second transcript with a second time period corresponding to the second portion;

storing the plurality of multimedia files in the collaboration container based on a storage order;

receiving, from at least one user, a first association of a first label with the first multimedia file and a second association of a second label with the second multimedia file;

updating the collaboration container such that the plurality of multimedia files are ordered in accordance with the first label and the second label;

identifying one or more keywords within the plurality of multimedia files;

determining one or more topics associated with the one or more keywords;

determining one or more chapters associated with the plurality of multimedia files based on the one or more topics, wherein at least a chapter of the one or more chapters corresponds to multiple portions of the plurality of multimedia files that share a common keyword of the one or more keywords;

receiving a second request to playback the plurality of multimedia files in the collaboration container; and responsive to receiving the second request to playback the plurality of multimedia files in the collaboration container, causing for playing on a client device at least a portion of the plurality of multimedia files in an order associated with the first label and the second label, wherein one or more first multimedia files associated with the first label are played back before one or more second multimedia files associated with the second label.

2. The one or more non-transitory computer-readable media of claim 1, wherein each of the plurality of multimedia files is associated with a label, the method further comprising playing the plurality of multimedia files in a second order as designated by each respectively associated label, wherein the plurality of multimedia files include at least two multimedia subfiles extracted from at least one of the first transcript or the second transcript, each of the at least two multimedia subfiles having a different associated topic.

3. The one or more non-transitory computer-readable media of claim 1, the method further comprising associating one of a collaborative document or a link to a group-based communication system object with at least one multimedia file of the plurality of multimedia files.

4. The one or more non-transitory computer-readable media of claim 1, wherein a third multimedia file is an image file, and a fourth multimedia file is a voice audio file, wherein the method further comprising generating, responsive to a playback request, a new multimedia file that compiles the third multimedia file and the fourth multimedia file as a single multimedia file.

5. The one or more non-transitory computer-readable media of claim 1, wherein the method further comprises:
receiving, from the at least one user, a selection of a third label from a plurality of labels associated with the plurality of multimedia files; and
causing playback of a subset of multimedia files associated with the third label.

6. The one or more non-transitory computer-readable media of claim 1, wherein the method further comprises:
receiving a comment from the first user associated with a third multimedia file;
receiving a third request from the second user to playback a subset of the plurality of multimedia files, wherein the third multimedia file is in the subset of the plurality of multimedia files; and
displaying the comment from the first user associated with the third multimedia file in the group-based communication system during playback of the third multimedia file.

7. The one or more non-transitory computer-readable media of claim 1, wherein identifying the one or more keywords comprises:
determining that at least one of the first transcript or the second transcript include text representing dialogue associated with the plurality of multimedia files; and
extracting the one or more keywords from the at least one of the first transcript or the second transcript.

8. The one or more non-transitory computer-readable media of claim 1, wherein determining the one or more topics comprises determining that a number of the one or more keywords meets or exceeds a threshold number of keyword instances that are to occur to identify a topic for a multimedia file.

9. The one or more non-transitory computer-readable media of claim 1, wherein the method further comprises:
receiving at least one of a comment or an annotation made in association with the plurality of multimedia files in the collaboration container; and
causing display of the at least one of the comment or the annotation while the plurality of multimedia files in the collaboration container are being displayed.

10. A method for creating a collaboration container, comprising:
receiving a first request to create the collaboration container, wherein the collaboration container contains a collection of multimedia files;
receiving a plurality of multimedia files, wherein a first multimedia file of the plurality of multimedia files is received from a first user, and a second multimedia file of the plurality of multimedia files is received from a second user of a group-based communication system, wherein the first multimedia file corresponds to a first portion of a first synchronous multimedia collaboration session and the second multimedia file corresponds to a second portion of the first synchronous multimedia collaboration session or a second synchronous multimedia collaboration session, wherein the first synchronous multimedia collaboration session or the second synchronous multimedia collaboration session is initiated within a communication channel of the group-based communication system and that facilitates at least one of audio communications or video communications between multiple users that are each members of the communication channel;
determining that the first portion corresponds to a first section of a first transcript of the first synchronous multimedia collaboration session;
determining that the second portion corresponds to a second section of a second transcript of the first synchronous multimedia collaboration session or the second synchronous multimedia collaboration session;
associating the first section of the first transcript with a first time period corresponding to the first portion and associating the second section of the second transcript with a second time period corresponding to the second portion;
storing the plurality of multimedia files in the collaboration container based on a storage order;

receiving, from at least one user, a first association of a first label with the first multimedia file and a second association of a second label associated with the second multimedia file;

updating the collaboration container such that the plurality of multimedia files are ordered in accordance with the first label and the second label;

identifying one or more keywords within the plurality of multimedia files;

determining one or more topics associated with the one or more keywords;

determining one or more chapters associated with the plurality of multimedia files based on the one or more topics, wherein at least a chapter of the one or more chapters corresponds to multiple portions of the plurality of multimedia files that share a common keyword of the one or more keywords;

receiving a second request to playback multimedia files in the collaboration container; and responsive to receiving the second request to playback the multimedia files in the collaboration container, causing for playing on a client device at least a portion of the plurality of multimedia files in an order associated with the first label and the second label, wherein one or more first multimedia files associated with the first label are played back before one or more second multimedia files associated with the second label.

11. The method of claim 10, wherein each of the plurality of multimedia files is associated with a label, further comprising playing the plurality of multimedia files in a second order as designated by each respectively associated label, wherein the plurality of multimedia files include at least two multimedia subfiles extracted from at least one of the first transcript or the second transcript, each of the at least two multimedia subfiles having a different associated topic.

12. The method of claim 10, wherein a third multimedia file is an image file, and a fourth multimedia file is a voice audio file, further comprising generating, responsive to a playback request, a new multimedia file that compiles the third multimedia file and the fourth multimedia file as a single multimedia file.

13. The method of claim 10, further comprising:
receiving, from the at least one user, a selection of a third label from a plurality of labels associated with the plurality of multimedia files; and
causing playback of a subset of multimedia files associated with the third label.

14. The method of claim 10, further comprising:
receiving a comment from the first user associated with a third multimedia file;
receiving a third request from the second user to playback a subset of the plurality of multimedia files, wherein the third multimedia file is in the subset of the plurality of multimedia files; and
displaying the comment from the first user associated with the third multimedia file in the group-based communication system during playback of the third multimedia file.

15. A system for creating a collaboration container, comprising:
a data store;
a processor; and
one or more non-transitory computer-readable media storing computer-executable instructions that, when executed by the processor, perform a method of creating the collaboration container, comprising:
receiving a first request to create the collaboration container, wherein the collaboration container contains a collection of multimedia files;
receiving a plurality of multimedia files, wherein a first multimedia file of the plurality of multimedia files is received from a first user, and a second multimedia file of the plurality of multimedia files is received from a second user of a group-based communication system, wherein the first multimedia file corresponds to a first portion of a first synchronous multimedia collaboration session and the second multimedia file corresponds to a second portion of the first synchronous multimedia collaboration session or a second synchronous multimedia collaboration session, wherein the first synchronous multimedia collaboration session or the second synchronous multimedia collaboration session is initiated within a communication channel of the group-based communication system and that facilitates at least one of audio communications or video communications between multiple users that are each members of the communication channel;
determining that the first portion corresponds to a first section of a first transcript of the first synchronous multimedia collaboration session;
determining that the second portion corresponds to a second section of a second transcript of the first synchronous multimedia collaboration session or the second synchronous multimedia collaboration session;
associating the first section of the first transcript with a first time period corresponding to the first portion and associating the second section of the second transcript with a second time period corresponding to the second portion;
storing the plurality of multimedia files in the collaboration container based on a storage order;
receiving, from at least one user, a first association of a first label with the first multimedia file and a second association of a second label associated with the second multimedia file;
updating the collaboration container such that the plurality of multimedia files are ordered in accordance with the first label and the second label;
identifying one or more keywords within the plurality of multimedia files;
determining one or more topics associated with the one or more keywords;
determining one or more chapters associated with the plurality of multimedia files based on the one or more topics, wherein at least a chapter of the one or more chapters corresponds to multiple portions of the plurality of multimedia files that share a common keyword of the one or more keywords;
receiving a second request to playback multimedia files in the collaboration container; and
responsive to receiving the second request to playback the multimedia files in the collaboration container, causing for playing on a client device at least a portion of the plurality of multimedia files in an order associated with the first label and the second label, wherein one or more first multimedia files associated with the first label are played back before one or more second multimedia files associated with the second label.

16. The system of claim 15, wherein each of the plurality of multimedia files is associated with a label, the method further comprising playing the plurality of multimedia files in a second order as designated by each respectively associated label, wherein the plurality of multimedia files include at least two multimedia subfiles extracted from at least one of the first transcript or the second transcript, each of the at least two multimedia subfiles having a different associated topic.

17. The system of claim 15, the method further comprising associating one of a collaborative document or a link to a group-based communication system object with at least one multimedia file of the plurality of multimedia files.

18. The system of claim 15, wherein a third multimedia file is an image file, and a fourth multimedia file is a voice audio file, and wherein the method further comprises generating, responsive to a playback request, a new multimedia file that compiles the third multimedia file and the fourth multimedia file as a single multimedia file.

19. The system of claim 15, wherein the method further comprises:

receiving, from the at least one user, a selection of a third label from a plurality of labels associated with the plurality of multimedia files; and causing playback of a subset of multimedia files associated with the third label.

20. The system of claim 15, the method further comprising:

receiving a comment from the first user associated with a third multimedia file;

receiving a third request from the second user to playback a subset of the plurality of multimedia files, wherein the third multimedia file is in the subset of the plurality of multimedia files; and displaying the comment from the first user associated with the third multimedia file in the group-based communication system during playback of the third multimedia file.

* * * * *